United States Patent
Hermerding, II et al.

(10) Patent No.: US 9,152,473 B2
(45) Date of Patent: Oct. 6, 2015

(54) TABLE DRIVEN MULTIPLE PASSIVE TRIP PLATFORM PASSIVE THERMAL MANAGEMENT

(71) Applicants: James G. Hermerding, II, San Jose, CA (US); Ramya Subramanian, Hayward, CA (US); Vasudevan Srinivasan, Hillsboro, OR (US)

(72) Inventors: James G. Hermerding, II, San Jose, CA (US); Ramya Subramanian, Hayward, CA (US); Vasudevan Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 13/730,926

(22) Filed: Dec. 29, 2012

(65) Prior Publication Data

US 2014/0189378 A1    Jul. 3, 2014

(51) Int. Cl.
| | |
|---|---|
| G06F 1/26 | (2006.01) |
| G06F 9/50 | (2006.01) |
| G06F 1/20 | (2006.01) |
| G06F 1/32 | (2006.01) |

(52) U.S. Cl.
CPC .............. *G06F 9/5094* (2013.01); *G06F 1/206* (2013.01); *G06F 1/3234* (2013.01); *Y02B 60/142* (2013.01); *Y02B 60/167* (2013.01)

(58) Field of Classification Search
CPC ......... G60F 1/26; G60F 1/206; G60F 1/5094; G60F 9/5094; G60F 1/3234; Y02B 60/142; Y02B 60/167
USPC ....................................................... 713/300
See application file for complete search history.

(56) References Cited

U.S. PATENT DOCUMENTS

| | | | |
|---|---|---|---|
| 7,484,108 B2* | 1/2009 | Diefenbaugh et al. | 713/300 |
| 7,779,287 B2* | 8/2010 | Lim et al. | 713/500 |
| 7,814,489 B2* | 10/2010 | Uemura et al. | 718/103 |
| 8,135,970 B2 | 3/2012 | Gaskins et al. | |
| 8,176,347 B1 | 5/2012 | Gaskins et al. | |
| 8,315,746 B2 | 11/2012 | Cox et al. | |
| 8,543,846 B2* | 9/2013 | Lin et al. | 713/300 |

(Continued)

FOREIGN PATENT DOCUMENTS

| | | |
|---|---|---|
| EP | 1965288 A1 | 9/2008 |
| KR | 10-2011-0041570 A | 4/2011 |

(Continued)

OTHER PUBLICATIONS

International Search Report and Written Opinion received for International Application No. PCT/US2013/046350, mailed on Sep. 27, 2013.

(Continued)

*Primary Examiner* — Mark Connolly
(74) *Attorney, Agent, or Firm* — Alpine Technology Law Group LLC

(57) ABSTRACT

Methods and apparatus relating to table driven multiple passive trip, platform passive thermal management are described. In one embodiment, the power consumption limit of one or more components of a platform is modified based on one or more thermal relationships between one or more power consuming components of the platform and one or more heat generating components of the platform. Furthermore, a first relationship of the one or more thermal relationships indicates a mapping between a plurality of temperature thresholds and a corresponding plurality of performance limits. Other embodiments are also claimed and disclosed.

30 Claims, 6 Drawing Sheets

(56) References Cited

U.S. PATENT DOCUMENTS

| | | | |
|---|---|---|---|
| 8,898,494 B2* | 11/2014 | Schluessler et al. | 713/320 |
| 2001/0021217 A1 | 9/2001 | Gunther et al. | |
| 2004/0204899 A1 | 10/2004 | Gunther et al. | |
| 2004/0268166 A1 | 12/2004 | Farkas et al. | |
| 2007/0005152 A1 | 1/2007 | Karr et al. | |
| 2007/0067656 A1 | 3/2007 | Ranganathan et al. | |
| 2008/0011467 A1* | 1/2008 | Rodarte et al. | 165/287 |
| 2009/0099807 A1* | 4/2009 | Therien et al. | 702/132 |
| 2009/0299543 A1 | 12/2009 | Cox et al. | |
| 2010/0229012 A1 | 9/2010 | Gaskins et al. | |
| 2012/0173037 A1 | 7/2012 | Therien et al. | |
| 2012/0216065 A1 | 8/2012 | Nastacio | |
| 2012/0232877 A1 | 9/2012 | Bhagwat et al. | |
| 2012/0276949 A1 | 11/2012 | Dorsey et al. | |
| 2014/0188302 A1* | 7/2014 | Srinivasan et al. | 700/299 |

FOREIGN PATENT DOCUMENTS

| | | | |
|---|---|---|---|
| TW | 201033802 A | 9/2010 | |
| TW | 201428632 A | 7/2014 | |
| WO | 2007/149752 A1 | 12/2007 | |
| WO | 20141105133 A1 | 7/2014 | |

OTHER PUBLICATIONS

International Search report and Written Opinion received for PCT Application No. PCT/US2013/046580, mailed on Oct. 9, 2013.

Non-Final Office Action received for U.S. Appl. No. 13/730,240, mailed on Mar. 26, 2015.

"Advanced Configuration and Power Interface Specification", 618 pages, Sep. 2, 2004, Hewlett-Packard Corporation, Intel Corporation, Microsoft Corporation, Phoenix Technologies Ltd., Toshiba Corporation.

"Advanced Configuration and Power Interface Specification", 624 pages, Dec. 30, 2005, Hewlett-Packard Corporation, Intel Corporation, Microsoft Corporation, Phoenix Technologies Ltd., Toshiba Corporation.

"Advanced Configuration and Power Interface Specification", 631 pages, Oct. 10, 2006, Hewlett-Packard Corporation, Intel Corporation, Microsoft Corporation, Phoenix Technologies Ltd., Toshiba Corporation.

Office Action Received for Taiwanese Patent Application No. 102145921, mailed on May 7, 2015, 3 pages, list of cited "A" references appear in Latin on p. 3.

* cited by examiner

TABLE DRIVEN MULTIPLE PASSIVE TRIP PLATFORM PASSIVE THERMAL MANAGEMENT

FIELD

The present disclosure generally relates to the field of electronics. More particularly, an embodiment of the invention relates to table driven multiple passive trip, platform passive thermal management.

BACKGROUND

As integrated circuit (IC) fabrication technology improves, manufacturers are able to integrate additional functionality onto a single silicon substrate. As the number of these functionalities increases, however, so does the number of components on a single IC chip. Additional components add additional signal switching, in turn, generating more heat. The additional heat may damage an IC chip by, for example, thermal expansion. Also, the additional heat may limit usage locations and/or usage applications of a computing device that includes such chips.

For example, a portable computing device may solely rely on battery power for its operations. Hence, as additional functionality is integrated into portable computing devices, the need to reduce power consumption becomes increasingly important, for example, to maintain battery power for an extended period of time. Non-portable computing systems also face cooling and power consumption issues as their IC components use more power and generate more heat.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
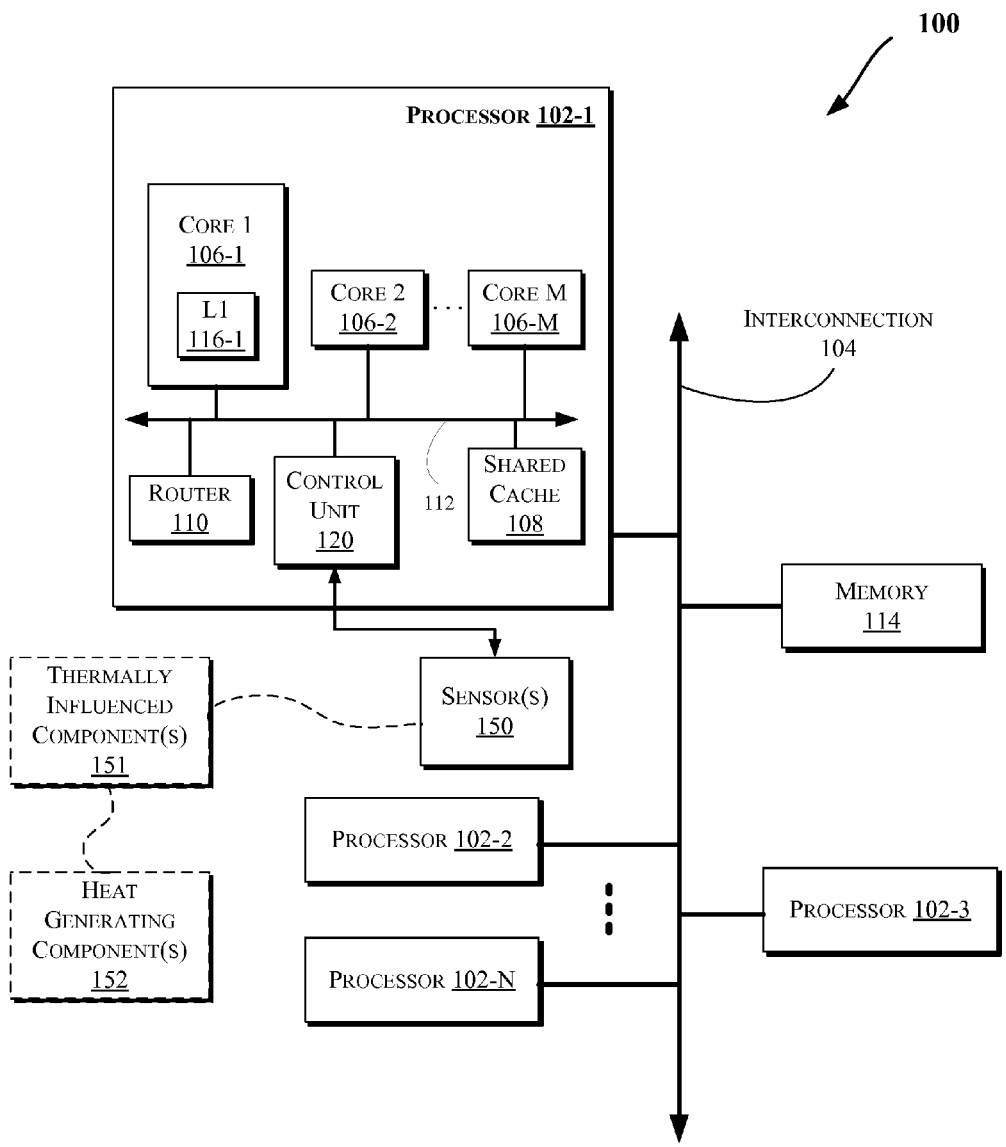
FIGS. 1 and 4-6 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof. Also, the use of "instruction" and "micro-operation" (uop) is interchangeable as discussed herein.

Power management is crucial for mobile devices (such as phones, tablets, UMPC (Ultra Mobile Personal Computer), laptop computers such as ultrabooks, etc.) and hence it is critical that such platforms are highly optimized from a power/thermal and performance point of view. In computing systems, the Advanced Configuration and Power Interface (ACPI) specification provides an open standard for device configuration and power management by the Operating System (OS). In some embodiments, at least some of the power consumption states and/or techniques discussed herein may be in accordance with or similar to those defined under ACPI specification, Revision 3.0, September 2004, which extends the thermal model beyond the previous processor centric support. This extended thermal model incorporated into ACPI 3.0 specification addresses a growing need for an intelligent and better holistic platform level thermal management of mobile platforms. The need arose, in part, because there are now more components on the system that are heat generators than just the processor as was the case several years ago when the previous version of the thermal model was defined (e.g., in revision 1.0).

Moreover, the implementation of ACPI 3.0 thermal model is also known as Dynamic Power Performance Management technology (DPPM). This new platform thermal management model involves the platform determining the relationship between different power consuming and heat generating components on the system and various hotspots on the system as measured by (e.g., dedicated) platform level thermal sensor(s). Then, the platform can expose these determined relationship information in the form of a Thermal Relationship Table (TRT). However, determining and generating the TRT values may be a cumbersome and time consuming process prone to errors and involves a lot of engineering effort. This has made ACPI 3.0 less feasible to incorporate into systems and hence may have resulted in hindrance for broad DPPM adoption.

Some modern platform level thermal management solutions (e.g., as defined in ACPI specification) may provide for one passive temperature threshold at which the OSPM (OS directed configuration and Power Management) or thermal management entity will start limiting power and/or performance of system components to recover from the thermal condition. Since there is only one passive temperature threshold that can be communicated by the platform to the OS, and that the OSPM or thermal management entity may end up limiting performance too much in response to a thermal condition, there needs to be a way to limit the performance reduction the OSPM will cause in response to a thermal condition to improve thermal/performance efficiency.

In order to prevent too much performance loss while taking thermal control actions, the ACPI specification provides for a _PDL ACPI object mechanism (which refers to Processor or Participant Depth Limit—providing a floor value for the performance reduction allowed when OSPM/DPPM is performing passive thermal management action). There is also a mechanism to allow the platform to progressively reduce the lower bound when the platform is notified of the temperature of the hotspot periodically using a _DTI ACPI object (which refers to Device Temperature Indication per the ACPI specification). Dynamic Power Performance Management (DPPM) technology uses a similar mechanism as defined by the ACPI specification and also extends that to other platform devices (participants) such that a consistent mechanism can be used by the platform to communicate a performance lower bound. This mechanism results in a somewhat elaborate platform BIOS (Basic Input/Output System) ACPI source code in terms of implementation and the various temperature values and the corresponding performance lower bound values are dispersed in the code. This however also cause confusion during implementation and debug.

To this end, some embodiments expose the mapping between various temperature thresholds and the corresponding performance lower bounds, e.g., in a concise table (that may be implemented by the BIOS), such that the code implementation complexity and debug is greatly reduced. Some embodiments eliminate the need for PDL and DTI ACPI objects and interactions, while still achieving more (or at least similar) benefits that those two objects intend to provide. Such techniques may be implemented in any platform, e.g., in an embedded controller implementation of thermal management and/or in OS power/thermal management. As such, some embodiments may be provided in various computing devices, e.g., including phones, UMPCs, tablets, laptops like ultrabooks, desktop computer, computer servers, etc. System on Chip (SoC) device(s), etc. (such as those discussed herein with reference to FIGS. 1 and 4-6).

Furthermore, the techniques discussed herein may be used in any type of computing system and/or processors discussed with reference to FIGS. 1 and 4-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, a router 110, and/or a processor control logic or unit 120. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache 116-1 (generally referred to herein as "L1 cache 116").

In one embodiment, the control unit/logic 120 causes modification to the TRT definition (i.e., relative to ACPI 3.0) and utilizes the modified TRT as an extended thermal relationship table instead of the original table to allow a thermal engineer to quickly come up with a relationship table based on the platform component placements and quick analysis of thermal behavior of various targets under various workloads. This saves a significant amount of time in thermal characterization and system design. Since the thermal trip points are predefined and loaded via the new table, it eliminates the need for platform BIOS or EC (Embedded Controller) firmware to reload the table for every trip cross event. Also, the passive control approach seeks an appropriate control point using the passive trip point, control limit information, and/or (e.g., constantly) adjusts performance/power to meet the thermal targets in various embodiments.

Furthermore, in some embodiments, logic 120 may operated based, at least in part, on input from OS software and/or software application(s) (e.g., that may be stored in the memory 114). Moreover, the ability to control the level of power/thermal setting(s) may be used to optimize platform power consumption/thermal behavior in response to various determinations such as based on the workload, scenario, usage, temperature, electric current, power consumption, etc. (e.g., based on input from one or more sensors 150 in some embodiments). As illustrated in FIG. 1, sensor(s) 150 may be thermally coupled or otherwise proximate to one or more components that are thermally influenced 151 (also referred to herein as target(s)) to detect variations in temperature that are caused by one or more heat generating components 152 (also referred to herein as source(s)). Furthermore, at least some OS operations discussed herein may be interchangeably performed by software applications, firmware, etc.

Figure 2:
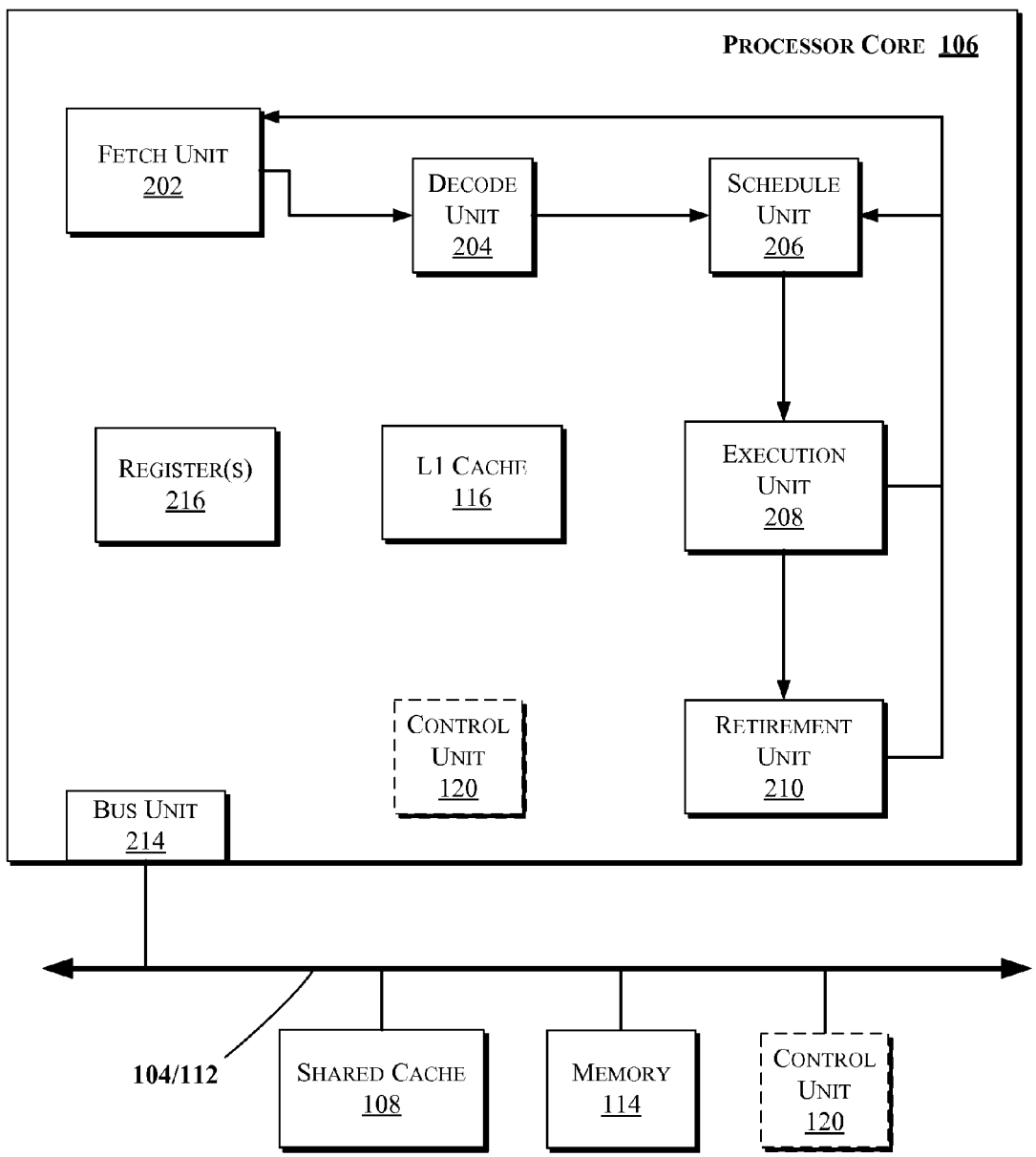
FIG. 2 illustrates a block diagram of portions of a processor core and other components of a computing system, according to an embodiment.

FIG. 2 illustrates a block diagram of portions of a processor core 106 and other components of a computing system, according to an embodiment of the invention. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), control units, memory controllers, or other components.

As illustrated in FIG. 2, the processor core 106 may include a fetch unit 202 to fetch instructions (including instructions with conditional branches) for execution by the core 106. The instructions may be fetched from any storage devices such as the memory 114 and/or the memory devices discussed with reference to FIGS. 4-6. The core 106 may also include a decode unit 204 to decode the fetched instruction. For instance, the decode unit 204 may decode the fetched instruction into a plurality of uops (micro-operations).

Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit. The execution unit 208 may also perform various arithmetic operations such as addition, subtraction, multiplication, and/or or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may also include a bus unit 214 to enable communication between components of the processor core 106 and other components (such as the components discussed with reference to FIG. 1) via one or more buses (e.g., buses 104 and/or 112). The core 106 may also include one or more registers 216 to store data accessed by various components of the core 106 (such as values related to power consumption state settings).

Furthermore, even though FIG. 1 illustrates the control unit 120 to be coupled to the core 106 via interconnect 112, in various embodiments the control unit 120 may be located elsewhere such as inside the core 106, coupled to the core via bus 104, etc.

An embodiment replaces the traditional TRT to provide more fine grained performance or power control of source devices and allows for multiple temperature trip points, e.g., to be defined per device. The new modified table is shown below in Table 1.

TABLE 1

| FIELD | DESCRIPTION |
|---|---|
| Source$_0$-Source$_n$ | Reference to the device that is the source of heat. Reference to the device that is being limited to alleviate the thermal condition of the source device. Every passive trip point for a target device could have multiple source devices that need to be limited. |
| Target | The device whose thermal threshold has crossed. |
| Sampling Period | The minimum period of time (e.g., in tenths of seconds) that OSPM should wait after applying a passive control to the device indicated by source device to detect its impact on the device indicated by target device. |
| PSV$_0$-PSV$_9$ Max Level | Indicates the maximum performance that OSPM may engage on the source device when a temperature exceeds the PSV0-PSV9 trip point values, where PSV stands for Passive Thermal Trip Point as defined in ACPI specification. |

Furthermore, a new table (Table 2 below) is defined to expose the passive trip points for various components on the system instead of only one, in accordance with an embodiment.

TABLE 2

| FIELD | DESCRIPTION |
|---|---|
| Target | The device whose thermal threshold has crossed. |
| PSV$_0$-PSV$_9$ | Passive thermal threshold for the target device, e.g., |

TABLE 2-continued

| FIELD | DESCRIPTION |
|---|---|
| | the lowest index corresponds to highest passive temperature threshold and the highest index corresponds to lowest passive temperature threshold. |

Figure 3:
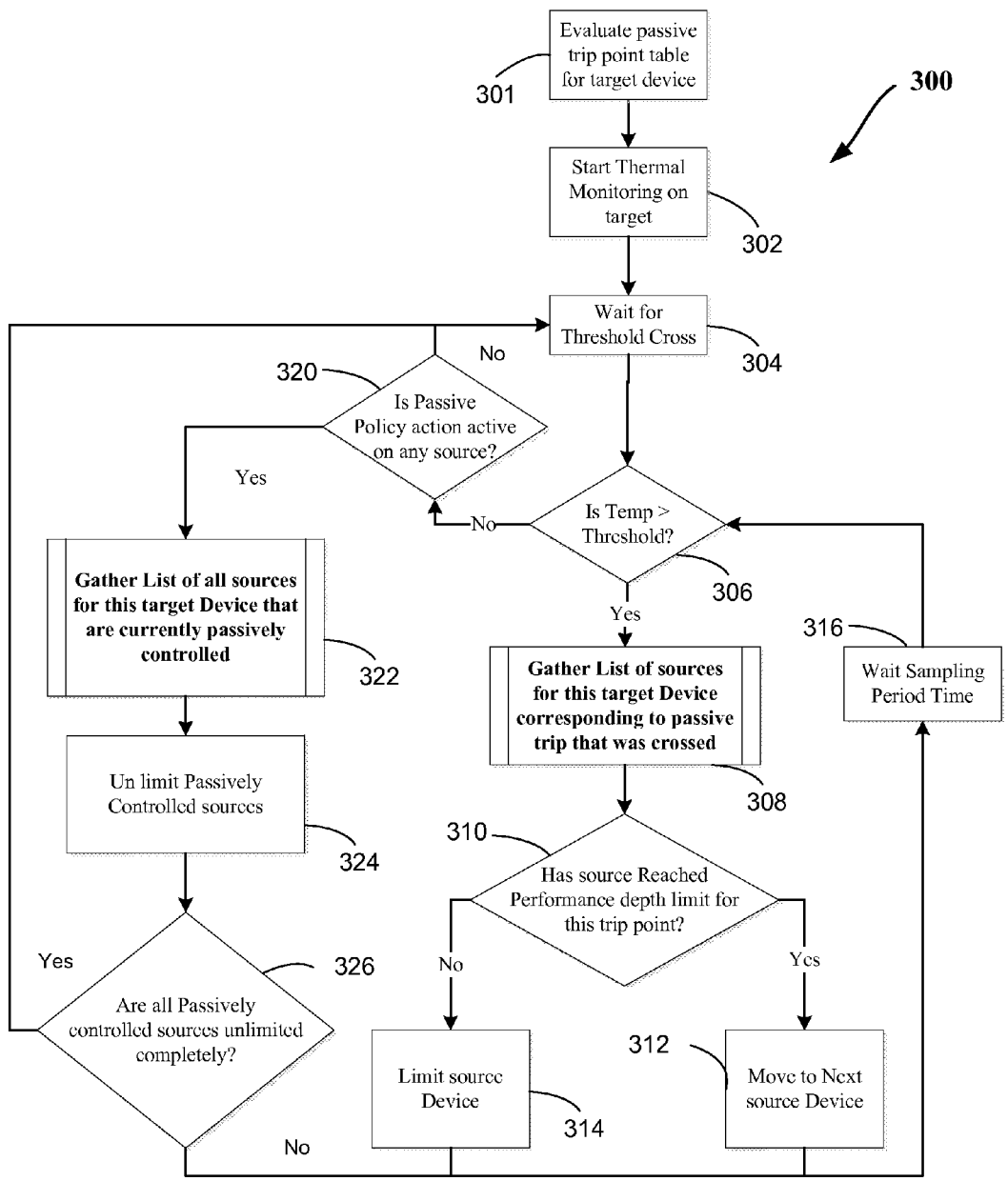
FIG. 3 illustrates a flow diagram of a method in accordance with an embodiment.

FIG. 3 illustrates a flow chart of a method 300 used to perform passive thermal control, according to an embodiment. One or more components of FIG. 1-2 or 4-6 (e.g., logic 120) may be used to perform one or more operations discussed with reference to FIG. 3 in various embodiments.

Referring to FIGS. 1-3, at an operation 301, the passive trip point table is evaluated (e.g., by a user or engineer) for a target device as further discussed below. At an operation 302, thermal monitoring is started on the target (e.g., using sensor(s) 150 that feed detected temperature values/information to logic 120). At an operation 304, method 300 waits for reaching/crossing a threshold value (such as a PSV value). If the detected temperature exceeds the threshold at operation 306, operation 308 gathers a list of source(s) for the target device corresponding to the passive trip that was crossed. At an operation 310, it is determined whether a source device has reached performance depth limit for this trip point. If so, the method moves to the next source device at an operation 312; otherwise, the source device of operation 310 is limited at an operation 314.

At operation 306, if the temperature has not exceeded the threshold, an operation 320 determines whether passive policy action is active on any sources. If not, method 300 continues waiting at operation 304; otherwise, an operation 322 gathers a list of (e.g., all) sources, for the target device, that are currently passively controlled. At an operation 324, (e.g., all) passively controlled source(s) are reduced (or unlimited) by one power/power level. An operation 326 determines whether (e.g., all) passively controlled source(s) are completely unlimited. If so, method 300 resumes with operation 304; otherwise an operation 316 waits for a sampling period of time (e.g., in accordance with the corresponding value stored in the TRT). As shown in FIG. 3, method 300 performs operation 316 after operations 312, 314, and 326.

In some embodiments, using the extended thermal relationship table instead of the original table allows a thermal engineer to quickly come up with a relationship table based on the platform component placements and quick analysis of thermal behavior of various targets under various workloads. This saves a significant amount of time in thermal characterization and system design. Since the thermal trip points are predefined and loaded via the new table, it eliminates the need for platform BIOS or EC (Embedded Controller) firmware to reload the table for every trip cross event. Also, the passive control algorithm implementation seeks an appropriate control point using the passive trip point, control limit information, and (e.g., constantly) adjusts performance/power to meet the thermal sources in various embodiments.

Table 3 below shows some sample temperature threshold values for a passive trip point table, according to an embodiment.

TABLE 3

| Target | PSV0 | PSV1 | PSV2 | PSV3 | PSV4 | PSV5 | PSV6 | PSV7 | PSV8 | PSV9 |
|---|---|---|---|---|---|---|---|---|---|---|
| CPU | 90 | | | | | 85 | | | | |
| Skin1 | 50 | | 45 | 40 | | | | | | |

Table 4 shows a control table with sample values, according to an embodiment, where Px stands for Performance State Limit and PL1 stands for Power Limit.

TABLE 4

| Target | Source | Sampling Period | PSV0 | PSV1 | PSV2 | PSV3 | PSV4 | PSV5 | PSV6 | PSV7 | PSV8 | PSV9 |
|---|---|---|---|---|---|---|---|---|---|---|---|---|
| CPU | CPU | 1 sec | Pn | | | | | P1 | | | | |
| Skin1 | CPU | 60 sec | Pn | | P5 | P1 | | | | | | |
| Skin1 | Memory | 30 sec | Lowest PL1 | | (PL1-1 Watt) | | | | | | | |

The control table (Table 4) defines the depth limit for any performance or power control (or other parameter, e.g., number of active cores, execution units, etc.) that can be applied on a source device when a target device's passive trip point is crossed. The technique can also be extended to include other thermal control policies like an active cooling policy and eliminate the need for having multiple tables to be exposed to the OSPM.

Furthermore, if there are two sources listed for the same target, a priority mechanism may be used to determine which source to limit first in some embodiments. In one embodiment, the power consumption limit of one or more components of a platform is modified based on one or more thermal relationships between one or more power consuming components of the platform and one or more heat generating components of the platform. Furthermore, a first relationship of the one or more thermal relationships indicates an influence priority of a source component of the platform on a target component of the platform.

In accordance with an embodiment, by making it easier to implement a holistic platform level thermal management solution, thermal behavior of the platform is improved and hence may indirectly help with the resilience avoiding any thermally induced malicious attacks (e.g., running severe workloads, causing unexpected operating conditions to trigger thermal conditions/management etc.).

Figure 4:
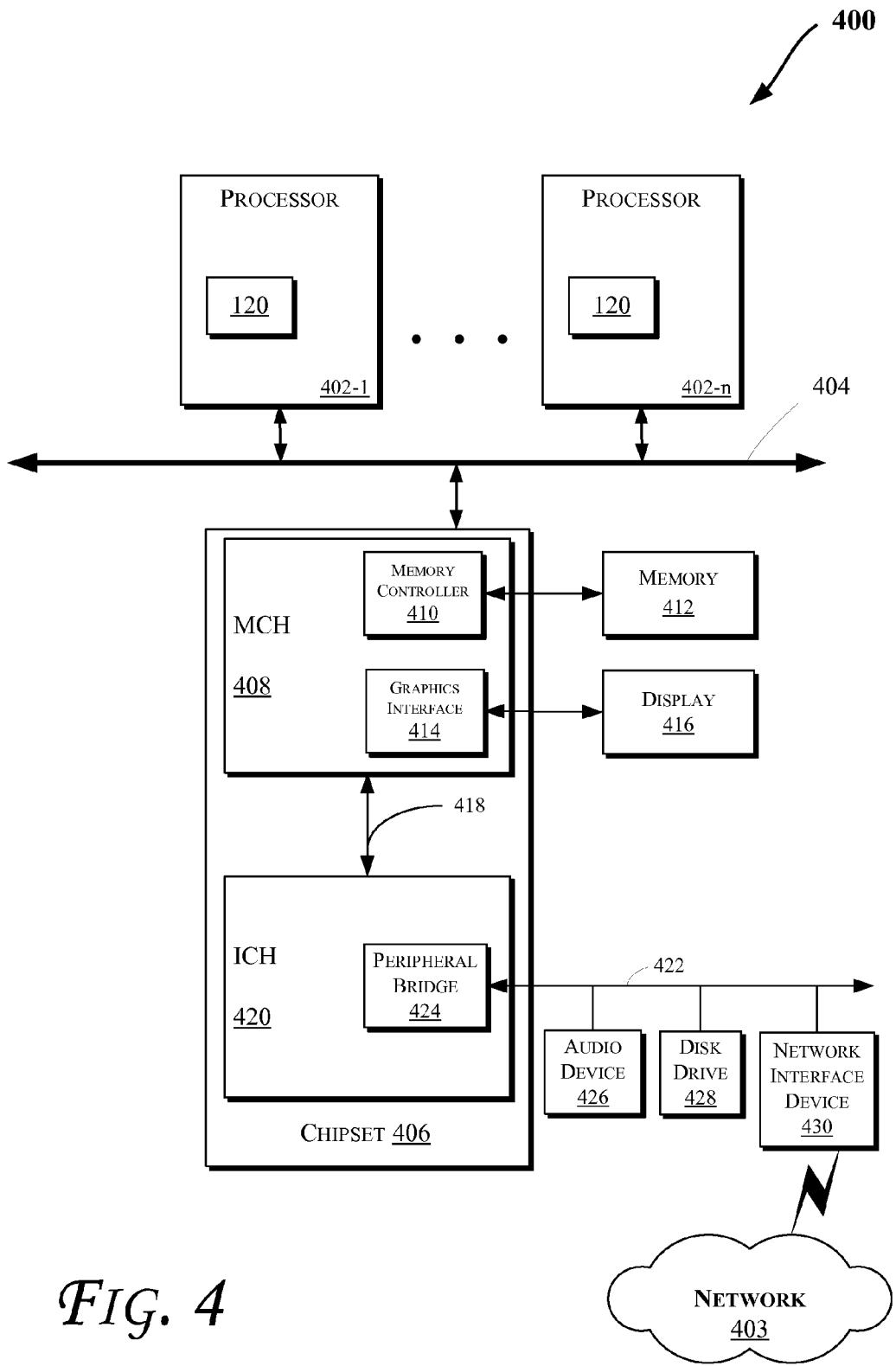

FIG. 4 illustrates a block diagram of a computing system 400 in accordance with an embodiment of the invention. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. For example, one or more of the processors 402 may include the control unit 120 discussed with reference to FIGS. 1-3. Also, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display device 416. In one embodiment of the invention, the graphics interface 414 may communicate with the display device 416 via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the MCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the MCH 408 in some embodiments of the invention. In addition, the processor 402 and one or more other components discussed herein may be combined to form a single chip (e.g., to provide a System on Chip (SOC)). Furthermore, the graphics accelerator 416 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
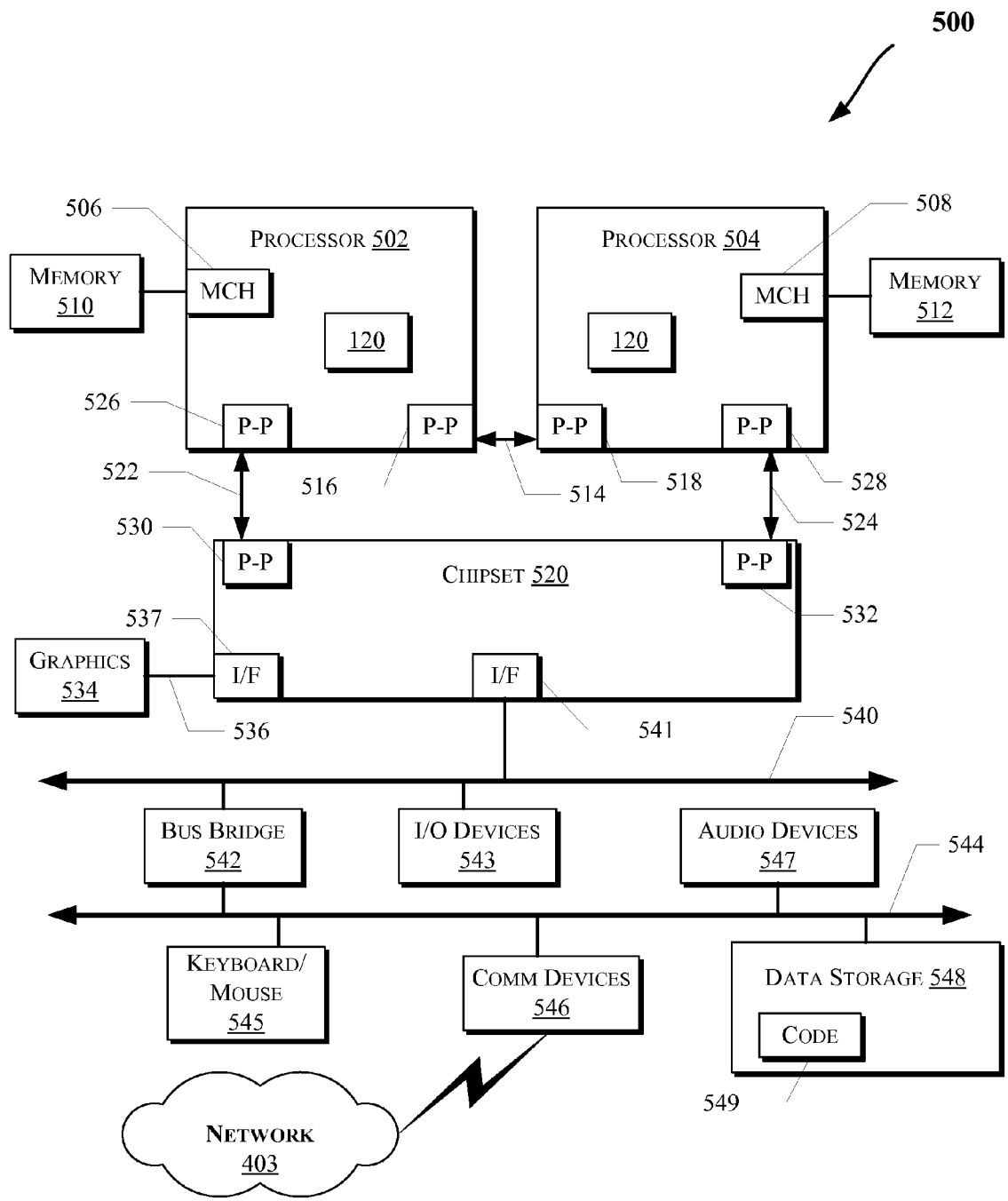

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment of the invention may be provided within the processors 502 and 504. For example, the control unit 120 of FIGS. 1-4 may be located within the processors 502 and 504. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
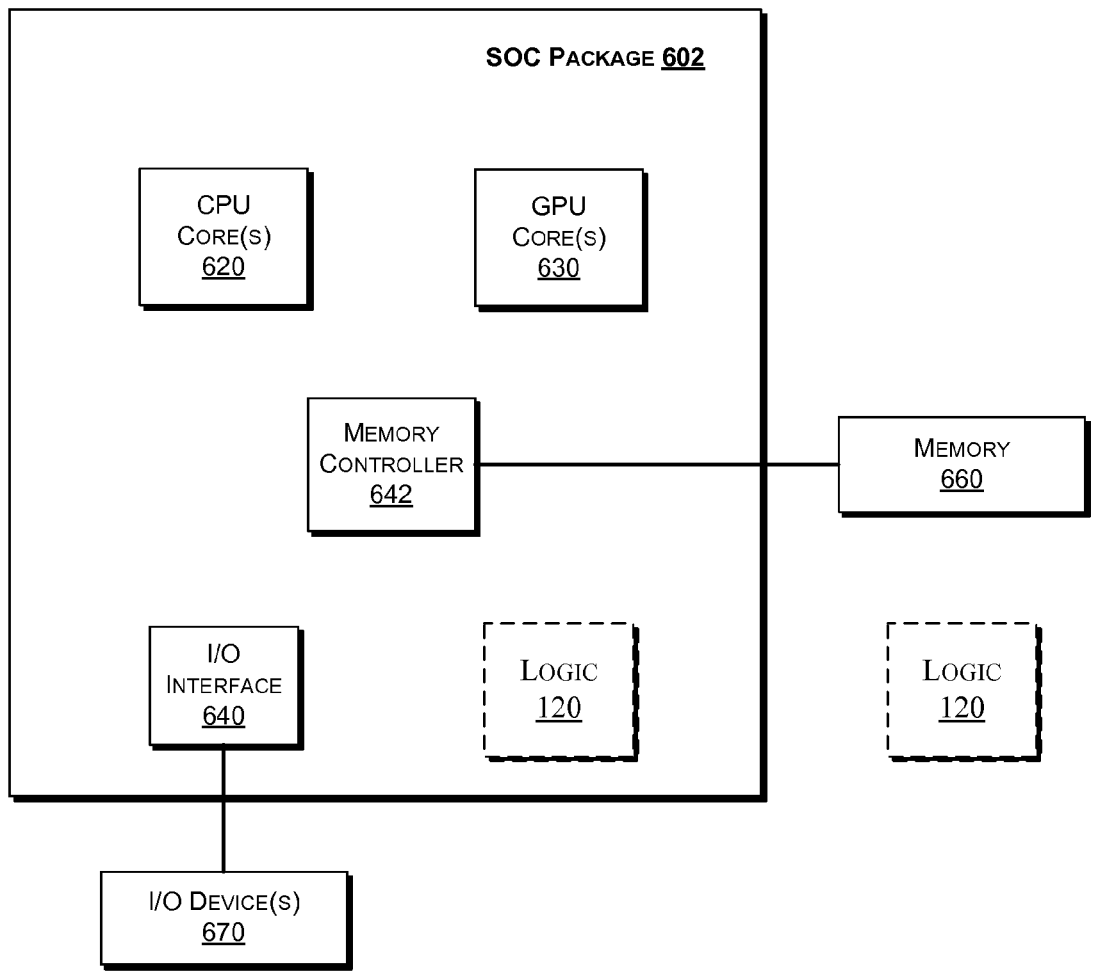

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processor Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 120 in an embodiment. Alternatively, the logic 120 may be provided outside of the SOC package 602 (i.e., as a discrete logic).

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including (e.g., a non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
 control logic, the control logic at least partially comprising hardware logic, to cause modification to a power consumption limit of one or more components of a platform based on one or more thermal relationships between one or more power consuming components of the platform and one or more heat generating components of the platform,
wherein a first relationship of the one or more thermal relationships is to indicate a mapping between a plurality of temperature thresholds and a corresponding plurality of performance limits.

2. The apparatus of claim 1, further comprising memory to store data corresponding to the one or more thermal relationships.

3. The apparatus of claim 1, further comprising logic to determine the one or more thermal relationships based on input from one or more sensors that are proximate to the one or more components of the platform.

4. The apparatus of claim 1, further comprising logic to determine the one or more thermal relationships based on a basic input/output system.

5. The apparatus of claim 1, further comprising logic to determine an impact of the modification to the power consumption limit after a sampling period of time lapses.

6. The apparatus of claim 1, wherein the one or more heat generating components is to comprise a source component.

7. The apparatus of claim 1, wherein the one or more power consuming components is to comprise a target component.

8. The apparatus of claim 1, wherein the one or more thermal relationships are to be stored in a thermal relationship table at least partially in accordance with Advanced Configuration and Power Interface (ACPI) specification.

9. The apparatus of claim 1, wherein the plurality of performance limits are to comprise a plurality of performance lower bound limits.

10. The apparatus of claim 1, further comprising memory to store an operating system software, wherein the operating system software is to trigger the modification to the power limit.

11. The apparatus of claim 1, further comprising memory to store an application software, wherein the application software is to trigger the modification to the power limit.

12. The apparatus of claim 1, wherein the one or more components are to comprise a processor having one or more processor cores.

13. The apparatus of claim 1, wherein one or more of the logic and the one or more components are on a same integrated circuit die.

14. A method comprising:
causing modification to a power consumption limit of one or more components of a platform based on one or more thermal relationships between one or more power consuming components of the platform and one or more heat generating components of the platform,
wherein a first relationship of the one or more thermal relationships indicates a mapping between a plurality of temperature thresholds and a corresponding plurality of performance limits.

15. The method of claim 14, further comprising determining an impact of the modification to the power consumption limit after a sampling period of time lapses.

16. The method of claim 14, further comprising storing the one or more thermal relationships in memory.

17. The method of claim 14, further comprising determining the one or more thermal relationships based on input from one or more sensors.

18. A computing system comprising:
memory to store data corresponding to one or more thermal relationships;
a processor coupled to the memory; and
control logic, the control logic at least partially comprising hardware logic, to cause modification to a power consumption limit of one or more components of the system based on the one or more thermal relationships between one or more power consuming components of the platform and one or more heat generating components of the platform,
wherein a first relationship of the one or more thermal relationships is to indicate a mapping between a plurality of temperature thresholds and a corresponding plurality of performance limits.

19. The system of claim 18, further comprising logic to determine the one or more thermal relationships based on input from one or more sensors that are proximate to the one or more components of the platform.

20. The system of claim 18, further comprising logic to determine the one or more thermal relationships based on a basic input/output system.

21. The system of claim 18, further comprising logic to determine an impact of the modification to the power consumption limit after a sampling period of time lapses.

22. The system of claim 18, wherein the one or more thermal relationships are to be stored in a thermal relationship table at least partially in accordance with Advanced Configuration and Power Interface (ACPI) specification.

23. The system of claim 18, wherein the plurality of performance limits are to comprise a plurality of performance lower bound limits.

24. The system of claim 18, wherein the memory is to store an operating system software, wherein the operating system software is to trigger the modification to the power limit.

25. The system of claim 18, wherein the memory is to store an application software, wherein the application software is to trigger the modification to the power limit.

26. A computer-readable medium to store instructions that when executed by a processor cause the processor to:
cause modification to a power consumption limit of one or more components of a platform based on one or more thermal relationships between one or more power consuming components of the platform and one or more heat generating components of the platform,
wherein a first relationship of the one or more thermal relationships indicates a mapping between a plurality of temperature thresholds and a corresponding plurality of performance limits.

27. The computer-readable medium of claim 26, wherein the instructions are to cause the processor to determine an impact of the modification to the power consumption limit after a sampling period of time lapses.

28. The computer-readable medium of claim 26, wherein the instructions are to cause the processor to store the one or more thermal relationships in memory.

29. The computer-readable medium of claim 26, wherein the instructions are to cause the processor to determine the one or more thermal relationships based on input from one or more sensors.

30. The computer-readable medium of claim 26, wherein the instructions are to cause the processor to determine the one or more thermal relationships based on a basic input/output system.

* * * * *